United States Patent
Ulrich

(10) Patent No.: US 6,422,377 B1
(45) Date of Patent: Jul. 23, 2002

(54) BELT CONVEYOR DEVICE FOR THE SUSPENDED TRANSPORT IN PARTICULAR, BY MEANS OF VACUUM, OF GOODS TO BE CONVEYED

(75) Inventor: Hans Anton Ulrich, Selm (DE)

(73) Assignee: NSM Magnettechnik GmbH & Co. KG, Olfen (DE)

( * ) Notice: Subject to any disclaimer, the term of this patent is extended or adjusted under 35 U.S.C. 154(b) by 0 days.

(21) Appl. No.: 09/652,831

(22) Filed: Aug. 31, 2000

(30) Foreign Application Priority Data

Sep. 6, 1999 (DE) .......................... 199 42 498

(51) Int. Cl.⁷ .............................................. B65G 15/42
(52) U.S. Cl. .................................................. 198/689.1
(58) Field of Search ...................... 198/689.1

(56) References Cited

U.S. PATENT DOCUMENTS

| | | | | |
|---|---|---|---|---|
| 3,182,998 A | * | 5/1965 | Peterson | 198/689.1 X |
| 4,804,081 A | * | 2/1989 | Lenhardt | 198/689.1 |
| 5,695,043 A | * | 12/1997 | Maezuru et al. | 198/689.1 |
| 5,878,868 A | | 3/1999 | Gotoh et al. | |
| 6,102,191 A | * | 8/2000 | Janzen et al. | 198/690.1 X |

FOREIGN PATENT DOCUMENTS

| | | |
|---|---|---|
| DE | 35 39 876 A1 | 5/1987 |
| DE | 196 14 741 C1 | 7/1997 |
| DE | 196 36 160 A1 | 3/1998 |
| DE | 196 36 161 A1 | 3/1998 |
| DE | 297 21 889 U1 | 3/1998 |
| DE | 198 23 582 A1 | 12/1999 |

* cited by examiner

Primary Examiner—James R. Bidwell
(74) Attorney, Agent, or Firm—Vickers, Daniels & Young

(57) ABSTRACT

A band conveyor device used for the suspended transport of plate-like workpieces, metal sheets or the like and has a conveyor belt which is moved along a holding track. A vacuum device holds the goods to be conveyed by suction against a transport side of the conveyor belt. The vacuum device has a multiplicity of suction nozzles which are disposed on the holding track at the transport side of the conveyor belt, so that their nozzle edges which point towards the transported goods to be conveyed are situated at a short distance from the goods. The air necessary for holding the goods is drawn through local, separate invariable vacuum zones, through which the goods pass in succession along the transport path.

18 Claims, 2 Drawing Sheets

BELT CONVEYOR DEVICE FOR THE SUSPENDED TRANSPORT IN PARTICULAR, BY MEANS OF VACUUM, OF GOODS TO BE CONVEYED

FIELD OF INVENTION

This invention relates to a belt conveyor device for the suspended transport in particular, by means of vacuum, of goods to be conveyed, particularly plate-like workpieces, metal sheets or the like, comprising at least one conveyor belt which can be moved along a holding track and comprising a vacuum device which holds the goods to be conveyed, by suction, against a transport side of the at least one conveyor belt.

BACKGROUND OF INVENTION

Vacuum belt conveyors of this type are frequently used in the sheet metal processing industry, in areas where metal sheets or workpieces made of sheet metal, such as can lids, panels in the automobile industry or the like, have to be conveyed suspended from one processing station to a further processing location. Vacuum belt conveyors are used in particular for the transport of non-ferromagnetic materials, for example for aluminum sheets, plastics sheets or wooden materials. The transported goods to be conveyed are held by suction, by the vacuum device, against the conveyor belt or conveyor belts, and are thereby held on the conveyor device whilst they are conveyed by means of the circulating conveyor belts.

Known vacuum belt conveyor devices generally necessitate special vacuum conveyor belts, which comprise holes disposed at a spacing from each other through which air is sucked into a vacuum channel disposed on the underside of the conveyor. Specially formed suction pockets are normally constructed around the holes on the belt itself. The vacuum which secures the metal sheet or the like to the conveyor is generated in these suction pockets when the workpiece is placed thereon.

Therefore, in known vacuum belt conveyor devices air is generally sucked through the conveyor belt and the vacuum which is necessary for holding the components to be conveyed is available directly on the transport side of the conveyor belt itself. For this purpose, the conveyor belts are of special construction, and are provided, for example, with individual flexible suction devices which protrude from the transport side and which surround the suction openings, or with vacuum pockets which are open towards the transport side, so as to be able to hold the metal sheets on the belt. Due to their special form of construction, conveyor belts for vacuum belt conveyor devices are very expensive. Moreover, they are also subject to a high degree of wear, because the individual suction devices which protrude from a belt are frequently damaged or torn off completely, and then have to be laboriously repaired or replaced. Vacuum pockets which are let into the belt itself are in fact less susceptible to wear than are protruding individual suction devices. In vacuum conveyor belts such as these, however, the seal between the belt and component to be conveyed is often unsatisfactory, so that unusually powerful vacuum devices have to be used in order to hold the components to be conveyed securely on the conveyor.

SUMMARY OF THE INVENTION

The object of the present invention is to create a belt conveyor device of the type cited at the outset, the at least one conveyor belt of which is only subjected to a very low degree of wear, and with which it is possible to use inexpensive standard belts for the transport of the goods to be conveyed, such as those which are otherwise used only on magnetic belt conveyors on which ferromagnetic components are held against the transport side of the belt by means of a magnetic field which acts through the belt.

This object is achieved according to the invention by providing the vacuum device with a multiplicity of suction nozzles, which are disposed on the holding track, at the side of and next to the at least one conveyor belt, so that their nozzle edges which point towards the transported goods to be conveyed are situated at a short distance from the latter or from the transport side of the conveyor belt.

The invention therefore constitutes a departure from the well-worn path of making the vacuum which is necessary for holding the components to be conveyed available on the conveyor belt itself, in suction devices or vacuum chambers which are disposed thereon and which circulate with the belt. According to the invention, the vacuum which is necessary for holding the components is now generated at fixed locations next to the conveyor belt or conveyor belts, by means of many suction nozzles, which are disposed in series, which are aligned towards the transported goods to be conveyed, and which hold the latter by suction against the conveyor belt or conveyor belts which run at the side of and as close as possible to the suction nozzles. Since there is only a short distance between the front nozzle edges of the suction nozzles and the transport side of the conveyor belt, or between the front nozzle edges and the flat face of the transported component which is held by suction, and in the ideal case, for example, this distance amounts only to a few tens of millimeters, the amount of secondary air which is sucked through this gap which remains between the nozzle edge and the component is also insignificantly small as soon as the suction nozzle concerned is completely covered by the transported component. Therefore, even though the transported components do not come into direct contact with the suction nozzles, they are secured by the latter and are pulled against the conveyor belt, by means of which they are transported from a transfer station to a delivery station.

Since according to the invention the air which is necessary for holding the components is no longer sucked through the belt itself, but local, invariable vacuum zones, through which a component passes in succession on its transport path, are instead created on the conveyor device by the multiplicity of fixed suction nozzles, simple standard belts can be used as conveyor belts, the transport side of which forms a simple flat surface without additional suction devices, vacuum indentations or the like having to be provided. For example, it is possible to use belts for the conveyor device such as those which were hitherto used only on purely magnetic belt conveyors.

The suction nozzles are preferably disposed between two parallel conveyor belts which can be moved along the holding track. They then form a central suction region between the two conveyor belts for the metal sheets or the like, which in their suction-held state are supported uniformly on the two conveyor belts. It is also possible for the vacuum device to comprises at least two groups, which each have a plurality of suction nozzles and which are disposed in series next to the longitudinal edges of the belt on both sides of the conveyor belt or conveyor belts. In this embodiment, suction regions for the components to be conveyed are therefore situated at both longitudinal edges of the conveyor belt or conveyor belts.

It is particularly advantageous if a separate vacuum generator is associated with each suction nozzle, so that the air which is sucked in by a suction nozzle, in the suction region of which there is no workpiece, has no effect on the effective suction capacity of the suction nozzles, the suction regions of which are transporting a workpiece. The vacuum generators for the individual suction nozzles may consist of fans, venturi nozzles or of what are termed "air movers", which are also termed "air quantity boosters" and which, similarly to venturi nozzles, can suck in large amounts of ambient air at one end with the aid of compressed air.

The vacuum generators for at least one part of the suction nozzles are preferably connectable and disconnectable individually and/or in groups. It is thereby possible deliberately to interrupt the generation of the vacuum at selected suction nozzles and thus to release the transported components exactly at a desired location by turning off the vacuum for a short time.

The vacuum generators are advantageously disposed in the vicinity of the nozzle edges of the suction nozzles, which results in a particularly compact form of construction and whereby losses due to suction lines which are too long can be avoided. The suction nozzles can be disposed at a constant, fixed spacing from each other on the holding track of the belt conveyor device. It is particularly advantageous, however, if the suction nozzles are disposed on the holding track so that their spacing from each other is adjustable, especially if the number of suction nozzles which are provided on the holding track of the conveyor is variable. The spacings of the suction nozzles and the number thereof can then be adjusted in the optimum manner, depending on the size and weight of the components to be conveyed, so that for each component to be conveyed a sufficient number of nozzles always simultaneously generates the vacuum at the upper surface thereof and thereby hold the component, but so that no more suction nozzles have to be used than are necessary. It is also possible, of course, to achieve a corresponding effect with an arrangement of the suction nozzles at a fixed spacing from each other, for example if the components to be conveyed are particularly light, by arranging for only each second or even for only each third nozzle to be effective and to generate suction at the upper surface of the goods to be conveyed, with the remaining nozzles only being effective during the transport of heavier components.

A particularly advantageous embodiment of the invention is created if magnet units which act on the transport track are associated with the conveyor belt or conveyor belts, so that by means of the magnet units the belt conveyor device, as a combination conveyor, can transport ferromagnetic components which are pulled against the conveyor belts by magnetic fields which act through the latter, whilst non-ferromagnetic components are held against the belts by suction by means of the vacuum device. At least one part of the magnet units is advantageously connectable and disconnectable individually or in groups, as is known in the art, so as to be able to release the ferromagnetic sheets or the like at the desired location.

If the conveyor belt or conveyor belts are reinforced with steel inserts, not only do they have a particularly long service life, but the belts themselves—provided that the conveyor is provided with magnet units—are pulled strongly by the magnets against the underside of the conveyor and are seated against the latter in a substantially air-tight manner, so that in this region also the vacuum device cannot suck in secondary air. The conveyor belt or conveyor belts are advantageously pressed against the holding track by means of retaining strips which act on their longitudinal sides, in order reliably to prevent sagging of the belts if the latter are not provided with steel inserts and/or if the conveyors are not provided with magnet units.

The suction nozzles preferably have an approximately circular or elliptical cross-section in the region of their nozzle edges, but can also be rectangular, particularly for nozzles which directly adjoin each other on the conveyor, so that practically no free space, in the region of which no suction can be generated, remains between two adjacent nozzles in the longitudinal direction of the conveyor.

The conveyor belt or conveyor belts can be disposed circulating around a box-like supporting construction on the underside of which the holding track is formed, wherein the magnet units and/or the vacuum generator are disposed in the interior of the supporting construction. This results in a particularly compact, low-maintenance form of construction. It is also possible, of course, for the vacuum generators to be disposed outside the supporting construction.

Other features and advantages of the invention follow from the description given below and from the drawings, in which a preferred embodiment of the invention is explained in greater detail by way of example.

DETAILED DESCRIPTION OF PREFERRED EMBODIMENT

Figure 1:
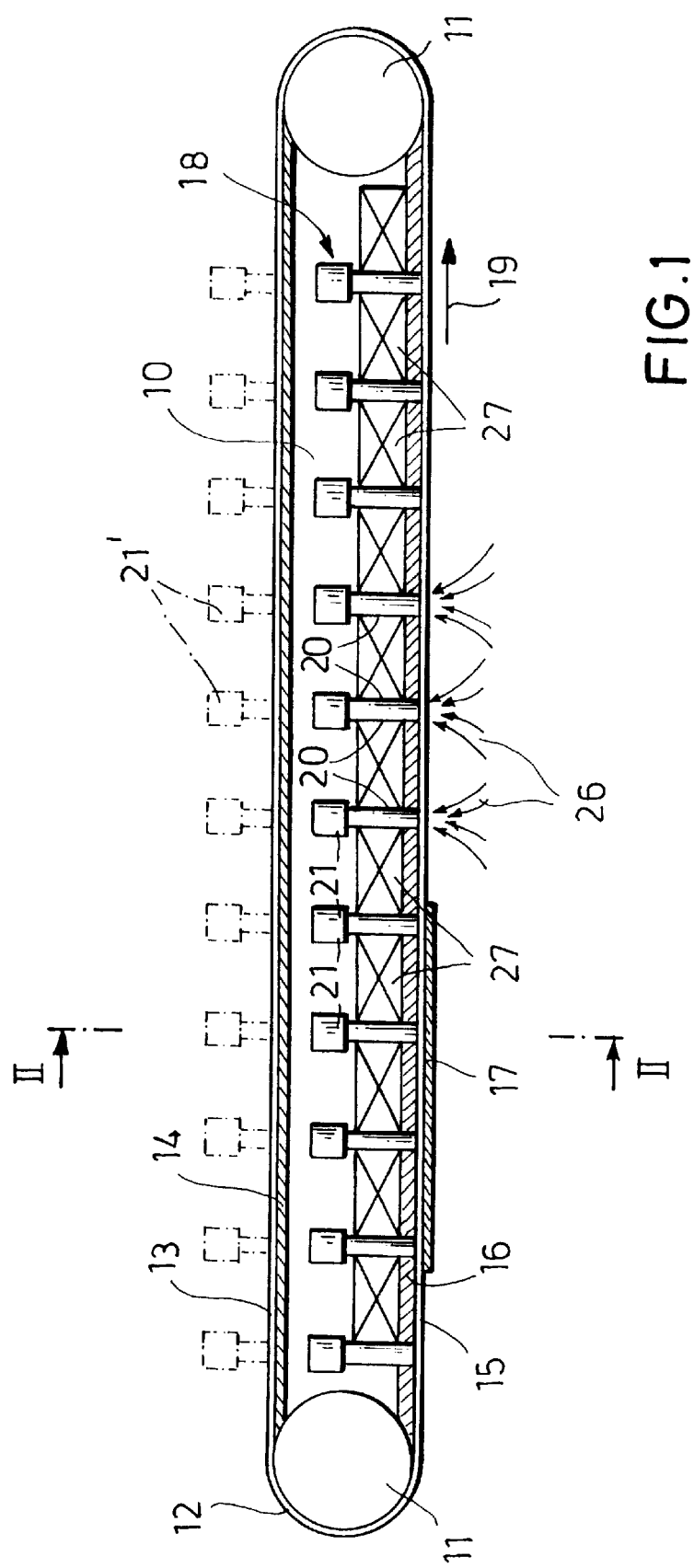
FIG. 1 is a highly schematic longitudinal section through a vacuum belt conveyor device.

The belt conveyor device which is illustrated in a considerably simplified form in the drawings comprises a box-like supporting construction 10, at the front and rear ends of which deflection rollers 11 for two conveyor belts 12 are disposed. The arrangement is designed so that the empty belt runs 13 of the conveyor belts, which travel on the upper surface of the supporting box 10, travel on the flat surface 14 of the supporting box, whilst the loaded belt runs 15 of the belts 12 are seated at the bottom of the supporting construction 10 against a holding track 16 which is provided there.

So as to be able to transport goods to be conveyed, particularly metal sheets 17 or other plate-like components, in a suspended manner by means of the belt conveyor device, the conveyor device is provided with a vacuum device which is denoted in its entirety by 18, by means of which the metal sheets 17 to be conveyed are held by suction against the two conveyor belts 12.

The vacuum device 18 essentially consist of a multiplicity of suction nozzles 20 which are disposed in series in the direction of conveying 19 and which are each equipped with a separate vacuum generator 21. The vacuum generators, which are merely illustrated schematically, can be fans, but are preferably air movers and/or venturi nozzles such as those which are already known in the art for use on vacuum belt conveyors.

Figure 2:
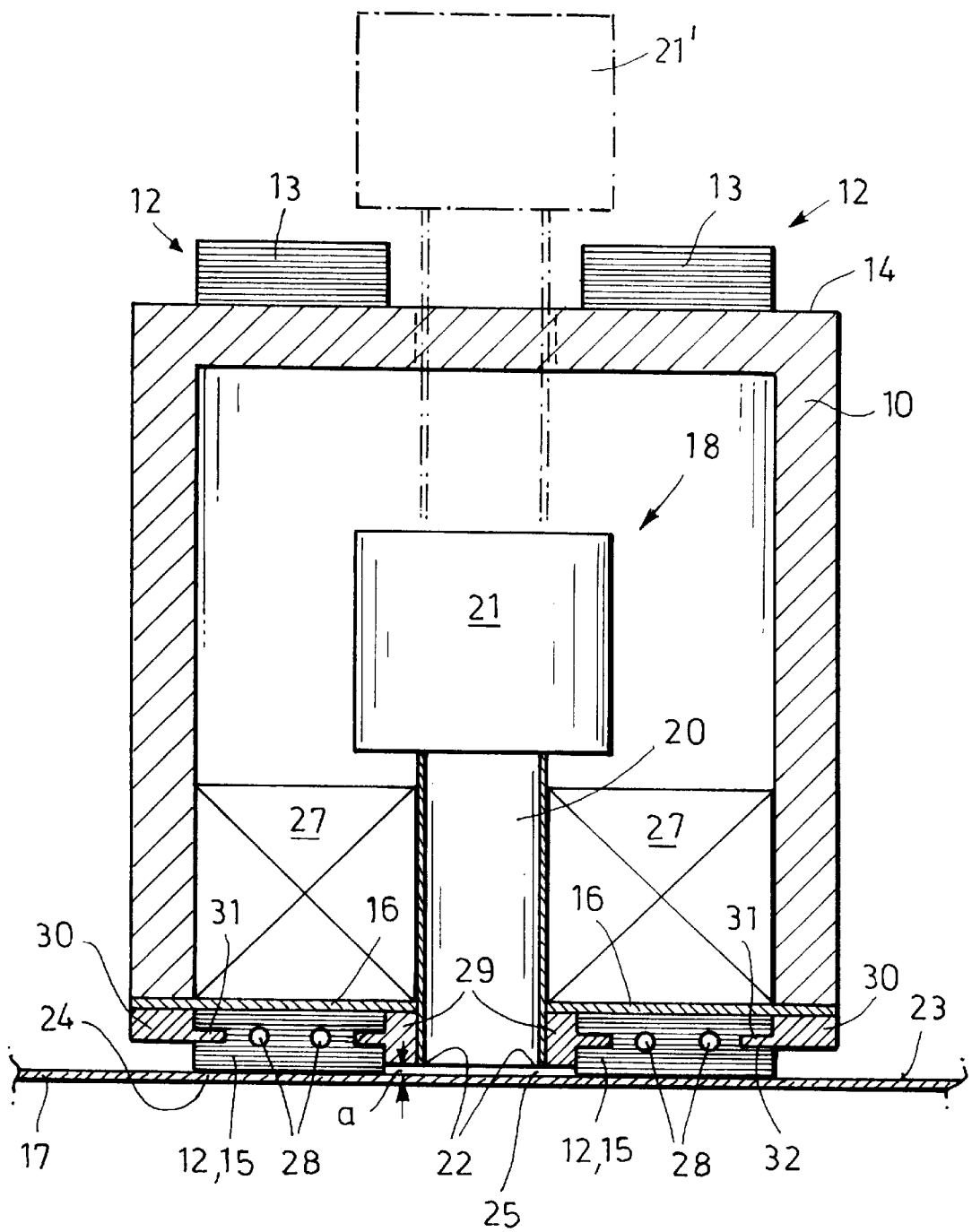
FIG. 2 is an enlarged cross-section, along line II—II, through the belt conveyor device shown in FIG. 1.

As can be seen from FIG. 2 in particular, the suction nozzles are disposed on the holding track 16, directly at the side of and next to the two conveyor belts 12 and between the latter. The suction nozzles protrude from the holding track 16 by an extent such that their nozzle edges 22 which point towards the metal sheets 17 are situated at a short distance a from the upper side 23 of the metal sheets or at a short distance from the transport side 24 of the conveyor belt. Only a very narrow gap 25 therefore remains between the nozzle edges 22 of the suction nozzles 20 and a transported metal sheet 17, the thickness of which gap is generally less than one millimeter but which can even amount to a few tens of millimeters in some cases. Due to this low gap thickness a, the suction effect which is exerted by the suction nozzles on the metal sheet to be conveyed is sufficient to hold the latter against the action of gravitational force and to pull it securely against the two conveyor belts which run at the side of and next to the suction nozzles. As can be seen from FIG. 1, during the transport of the metal sheets there is always a plurality of suction nozzles which participate simultaneously in holding the metal sheet by suction against the conveyor belt, wherein each suction nozzle generates a fixed "suction field" or vacuum zone 26, and on its transport path the transported metal sheet 17 enters, in succession, the regions of action of the individual suction fields which ensure the contact pressure of the metal sheet against the conveyor belt.

As can be seen from the drawings, the vacuum generators 21 for the individual suction nozzles 20 are preferably accommodated in the interior of the supporting construction 10, and as far as possible are accommodated in the vicinity of the nozzle edges 22 of the suction nozzles 20, which are thus only of short length themselves. It is also possible, of course, for the vacuum generators 21 to be disposed outside the supporting construction, for example on the upper surface 14 thereof, as is indicated by the dash-dot lines with reference numeral 21'.

As can be seen in particular from FIG. 2, magnet units 27, which are associated with the two conveyor belts, 12, are provided in the supporting construction, at the side of and next to the suction nozzles 20. These magnet units essentially consist of connectable and disconnectable permanent magnets which are known in the art, the magnetic fields of which penetrate the conveyor belt 12 so that ferromagnetic materials can be transported by this means in the manner known in the art. The conveyor belts 12 themselves are provided with ferromagnetic steel inserts 28 and are thus held tightly against the holding track 16 by the magnet units 27. In addition, any downward sagging of the loaded belt runs 15 of the conveyor belts is prevented by retaining strips 29, 30 which are mounted on the underside of the supporting construction, at the side of and next to the holding track 16, and which are also mounted on the outside of the suction nozzles 20, rib-like projections 31 of which retaining strips fit into channels 32, which are matched thereto, in the conveyor belts.

At least one part of the magnet units 27 which are disposed in series over the length of the conveyor is connectable and disconnectable in the manner known in the art, so that the transported metal sheets which are held by means of the magnets can be released at the desired location. In a corresponding manner, the vacuum generators 21 of the suction nozzles are connectable and disconnectable at least in the region of the release location, so that in order to release a metal sheet which is held by means of the vacuum device the generation of suction can be interrupted for a short period and the metal sheet is then detached from the conveyor belts due to gravity.

The invention is not restricted to the example of an embodiment which is described and illustrated. Rather, many modifications and additions are possible without departing from the scope of the invention. For example, it is possible for the suction nozzles of the vacuum device to be subdivided into a plurality of groups which are disposed in series on both sides of each conveyor belt at the longitudinal belt edges thereof, so that the nozzle edges of the suction nozzles reach almost as far as the workpiece to be conveyed.

The suction nozzles can be fixedly disposed at a uniform spacing on the supporting construction, whereupon a higher carrying capacity is achieved when the suction nozzles are disposed nearer to one another. It can be particularly advantageous for the suction nozzles to be displaceably disposed on the supporting construction so that their spacings from each other can be adjusted. The arrangement can also be designed so that additional nozzles can be installed subsequently if need be, or so that superfluous suction nozzles can be removed, so that it is always only the optimum number of suction nozzles which are required for conveying a workpiece which is provided in the installation. A definitive feature of the invention is the fact that the transported metal sheets or the like are not held against the belt by suction through the latter, but that the suction effect is produced at the side of and next to the belts, whereby simple standard belts can be used for the conveyor device, which do not have to comprise special suction devices or suction pockets and which therefore are not only particularly inexpensive and durable but can also be cleaned without problems and in general are insensitive to soiling. By means of the invention, the problem is also eliminated of providing a seal between the circulating conveyor belts and the vacuum device which is fixedly disposed on the conveyor; a seal such as this was necessary on vacuum conveyors which were known hitherto and was generally problematical.

What is claimed is:

1. A belt conveyor device for the suspended transport of goods to be conveyed, comprising:

a holding track plate situated above at least one conveyor belt, said at least one conveyor belt having a transport surface and longitudinal edges, which can be moved along the holding track plate in a direction of conveying, and a vacuum device capable of holding goods to be conveyed, by suction, against the transport surface of said at least one conveyor belt, said vacuum device comprising;

a multiplicity of suction nozzles disposed in series in the direction of conveying of the at least one conveyor belt, said nozzles being disposed on the holding track plate, at the side of and next to the at least one conveyor belt, said suction nozzles having nozzle edges directable towards goods to be conveyed and being situated at short distance (a) from said goods or from said transport surface of the at least one conveyor belt.

2. The belt conveyor device of claim 1 comprising two conveyor belts which can be moved in parallel along said holding track plate, said suction nozzles being disposed between said two conveyor belts.

3. The belt conveyor device of claim 1 wherein said vacuum device comprises at least two groups of said suction nozzles, each said group comprising a plurality of said suction nozzles, said groups being disposed in series next to said longitudinal edges of the belt on both sides of said at least one conveyor belt.

4. The belt conveyor device of claim 1 comprising a plurality of separate vacuum generators, each said separate vacuum generator being associated with at least one of said suction nozzles.

5. The belt conveyor device of claim 4 wherein said separate vacuum generators for said suction nozzles essentially consist of fans, venturi nozzles, air movers or combinations thereof.

6. The belt conveyor device of claim 4 wherein said vacuum generators for at least one part of the suction nozzles are connectable and disconnectable individually or in groups or both.

7. The belt conveyor device of claim 4 wherein said vacuum generators are disposed in the vicinity of said nozzle edges of said suction nozzles.

8. The belt conveyor device of claim 1 wherein said suction nozzles are disposed at a constant, fixed spacing from each other.

9. The belt conveyor device of claim 1 wherein said suction nozzles are disposed on said holding track plate so that their spacing from each other is adjustable.

10. The belt conveyor device of claim 1 comprising magnet units associated with said at least one conveyor belt, said magnet units acting on said holding track plate.

11. The belt conveyor device of claim 10 wherein at least one part of said magnet units is connectable and disconnectable individually or in groups or both.

12. The belt conveyor device of claim 1 comprising steel inserts for reinforcing said at least one conveyor belt.

13. The belt conveyor device of claim 1 comprising retaining strips which act on said longitudinal sides of said at least one conveyor belt to press said at least one conveyor belt against said holding track plate.

14. The belt conveyor device of claim 1 wherein said suction nozzles have an approximately circular or elliptical cross-section in the region of said nozzle edges.

15. The belt conveyor device of claim 10 comprising a box-like supporting construction having an underside and an interior, said at least one conveyor belt being disposed circulating around said supporting construction said holding track plate being formed on said underside of said supporting construction, and said magnet units being disposed in said interior of said supporting construction.

16. The belt conveyor device of claim 4 comprising a box-like supporting construction having an underside and an interior, said at least one conveyor belt being disposed circulating around said supporting construction, said holding track plate being formed on said underside of said supporting construction, and said vacuum generators being disposed in said interior of said supporting construction.

17. The belt conveyor device of claim 4 wherein said vacuum generators are disposed outside said supporting construction.

18. A belt conveyor device for the suspended transport of goods to be conveyed, comprising:

a holding track plate situated above at least one conveyor belt, said at least one conveyor belt having a transport surface and longitudinal edges, which can be moved along the holding track plate in a direction of conveying, and a vacuum device capable of holding goods to be conveyed, by suction, against the transport surface of said at least one conveyor belt, said vacuum device comprising;

a multiplicity of suction nozzles disposed in series in the direction of conveying of the at least one conveyor belt, said nozzles being disposed on the holding track plate, at the side of and next to the at least one conveyor belt, said suction nozzles having nozzle edges directable towards goods to be conveyed and being situated at short distance (a) from said goods or from said transport surface of the at least one conveyor belt;

a plurality of separate vacuum generators, each said separate vacuum generator being associated with at least one of said suction nozzles;

said vacuum generators for at least one part of said suction nozzles are connectable and disconnectable individually or in groups or both;

magnet units associated with said at least one conveyor belt, said magnet units acting on said holding track plate;

at least one part of said magnet units is connectable and disconnectable individually or in groups or both;

a box-like supporting construction having an underside and an interior, said at least one conveyor belt being disposed circulating around said supporting construction said holding track plate being formed on said underside of said supporting construction, and said magnet units being disposed in said interior of said supporting construction.

* * * * *